Aug. 22, 1944.  D. SEITER  2,356,359
FACING TOOL
Filed July 26, 1943
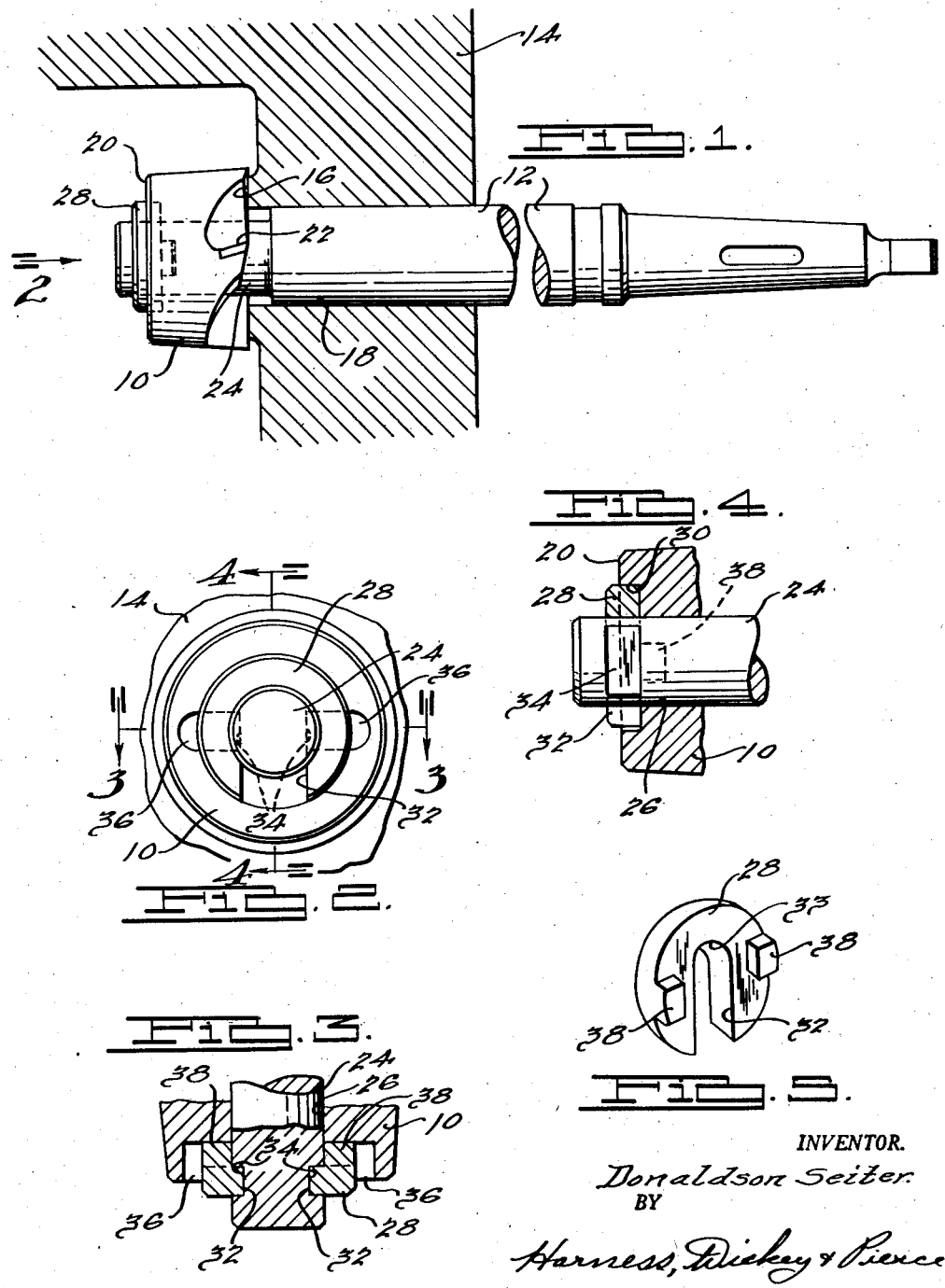
INVENTOR.
Donaldson Seiter.
BY
Harness, Dickey & Pierce.

Patented Aug. 22, 1944

2,356,359

UNITED STATES PATENT OFFICE 2,356,359

FACING TOOL

Donaldson Seiter, Detroit, Mich., assignor to Tungsten Carbide Tool Company, Detroit, Mich.

Application July 26, 1943, Serial No. 496,157

4 Claims. (Cl. 90—11)

The present invention relates to a rotary cutting tool and particularly relates to improvements in heavy duty, back spotfacers.

One of the primary objects of the present invention is to provide improvements in the drive connection between the cutter body and driving bar of back spotfacer assembly whereby the cutter body may be located in its work position and assembled in a simplified manner.

Other objects of the invention will become apparent from the following specification, from the drawing relating thereto and the claims hereinafter set forth.

In the drawing in which like numerals are used to designate like parts in the several views throughout:

Figure 1 is a broken, side elevational view of a back spotfacer assembly and illustrating such assembly in its work position with respect to the work;

Fig. 2 is an end view taken in the direction of arrow 2 of Fig. 1;

Fig. 3 is a cross-sectional view taken substantially along the line 3—3 of Fig. 2;

Fig. 4 is a cross-sectional view taken substantially along the line 4—4 of Fig. 2;

Fig. 5 is a perspective view of the connecting washer employed with the assembly of Figs. 1 through 4.

Referring to the drawing a back spotfacer assembly is shown comprising a rotary cutter 10 which is adapted to be drivingly connected to a driving bar or holder 12. The cutter is diagrammatically shown in a work position with respect to a piece of work 14. Such work 14 may be a casting having an interior surface 16 adjacent an aperture 18, in which the surface 16 is to be machined. Such surface 16 is located in an inaccessible place where it is difficult to position and assemble the cutting tool and driving bar. It will be appreciated that there is little work room or space on the inside of the casting to permit convenient assembly of the tool.

According to the present invention a simplified yet rugged drive connection is provided for the cutter assembly so that the cutter may be conveniently positioned and readily assembled in ordinarily inaccessible places.

The cutter 10 has a front face 20 and has a plurality of flutes and cutting edges 22 formed in the rear face thereof.

The drive bar 12 has a cylindrical portion which is adapted to be rotatably and slidably received within the aperture 18. The bar 12 also has an axial extension 24 of reduced diameter which is adapted to extend through an axial opening 26 provided in the cutter body 10. In the assembly, the bar is pushed through the opening 18 with the projecting portion 24 extending through the opening 26 and projecting beyond the face thereof. The cutter is drivingly locked to the driving bar 24 by means of washer 28. The face 20 of the cutter 10 is formed with a circular recess 30 within which the washer 28 fits. The wall of the recess 30 thus embraces the periphery of the washer 28 and prevents spreading of the washer legs when driving loads are imposed thereon.

The washer 28 is formed with slot 32 which terminates on radius 33, in which the radius 33 is the same as that of the extension 24 of the driving bar. The end 24 of the driving bar has a pair of diametrically opposed, milled slots 34 formed therein which are of such depth that the thickness across the bar is substantially the same as the width of slot 32, so that the washer 28 may be dropped over the bar with the side walls of slot 32 received within the slots 34. This will prevent axial or rotative displacement between the washer 28 and the driving bar and provide a driving connection therebetween.

The face 20 of the cutter body 10 is also formed with a pair of diametrically opposed recesses 36 which extend on opposite sides of the opening 26 and communicate therewith. The rear face of the driving washer 28 has a pair of diametrically opposed, integral projections 38 formed thereon which are substantially the same width as the width of the slots 36. Projections 38 are adapted to be received within the slots 36 to provide a driving connection between the cutter body 10 and the driving bar 12.

It will be appreciated that the above structure is quite simple and that the assembly of the cutter 10 on the driving bar 12 is a simple matter even in the inaccessible places in which it is to be used. It is merely necessary to drop the washer 28 over the inward end 24 of the cutter bar so that the sides of the slot 32 fall within the slots 34. The driving bar 12 may be rotated and drawn outwardly so that the projection 38 will move into slots 36. This will be automatically accomplished when the driving bar 12 is turned by the machine since such back spotfacer will automatically draw the drive bar 12 outwardly as it rotates. The disassembly is just as easy in that it is merely necessary to move the driving bar inwardly so as to disconnect the projections 38 from the slots 36. The washer 28 may then be removed from the inner end of the drive bar by sliding it radially outwardly.

Formal changes may be made in the specific embodiment of the invention described without departing from the spirit and substance of the invention, the scope of which is commensurate with the appended claims.

What is claimed is:

1. A back spotfacer assembly comprising a rotary cutter body having an axial opening therethrough, a drive recess formed in the front face of said body, a holder extending through said opening and projecting beyond the front face of said body, a non-radial surface formed on said holder and adapted to be positioned adjacent said front face, a removable member disposed to partially embrace said holder adjacent said front face and having integral portions co-operative with said recess and said surface to provide a driving connection between said cutter body and said holder.

2. A back spotfacer assembly comprising a rotary cutter body having an axial opening therethrough, a drive recess formed in the front face of said body, a drive bar extending through said opening and projecting beyond the front face of said body, a transverse slot formed in the periphery of said bar and adapted to be positioned adjacent said front face, a removable member disposed to partially embrace said holder adjacent said front face and having an integral portion disposed within said slot to prevent axial and rotative movement between said member and said bar and having another integral portion receivable within said recess to thereby provide a driving connection between said cutter body and said bar.

3. A back spotfacer assembly comprising a rotary cutter body having an axial opening therethrough, a drive recess formed in the front face of said body, a drive bar extending through said opening and projecting beyond the front face of said body, diametrically opposed, transverse slots formed in the periphery of said bar and adapted to be positioned adjacent said front face, a washer member having a slot disposed to partially embrace said bar adjacent said front face with the walls of said member adjacent said slot received within said diametrically opposed slots to prevent axial and rotative movement between said member and said bar, and said washer member having an integral projection on the rear face thereof receivable in said recess to thereby provide a driving connection between said cutter body and said bar.

4. A back spotfacer assembly comprising a rotary cutter body having an axial opening therethrough, a drive recess formed in the front face of said body and extending diametrically of said axial opening, a drive bar extending through said opening and projecting beyond the front face of said body, diametrically opposed, transverse slots formed in the periphery of said bar and adapted to be positioned adjacent said front face transversely of said recess, a washer member having a slot disposed to partially embrace said bar adjacent said front face with the walls of said member adjacent said slot received within said diametrically opposed slots to prevent axial and rotative movement between said member and said bar, and said washer member having integral projections on the rear face thereof on the opposite sides of the washer slot receivable in said recesses to thereby provide a driving connection between said cutter body and said bar.

DONALDSON SEITER.